United States Patent [19]
King

[11] 3,813,739
[45] June 4, 1974

[54] METHOD OF AND APPARATUS FOR MAKING HOLLOW 3-D MATERIAL

[75] Inventor: Robert W. King, Lexington, Mass.

[73] Assignee: Avco Corporation, Cincinnati, Ohio

[22] Filed: Oct. 20, 1972

[21] Appl. No.: 299,414

[52] U.S. Cl. .............................. 28/1 R, 29/148.4 D
[51] Int. Cl. ............................................. B21h 1/14
[58] Field of Search ...................... 28/1 R, 4 R, 72; 29/148.4 D, 121 R, 131; 26/2, 68; 242/62

[56] References Cited
UNITED STATES PATENTS
2,774,296 12/1956 Martinmaas ...................... 28/4 R X
2,920,373 1/1960 Gresham .......................... 28/4 R X
3,351,990 11/1967 Schuster .......................... 26/2 R X Primary Examiner—Louis K. Rimrodt
Attorney, Agent, or Firm—Charles M. Hogan, Esq.; Abraham Ogman, Esq.

[57] ABSTRACT

The invention relates to 3-D material where layers of fabric are pierced and reinforcement is inserted in the passages thus formed. Generally, the invention relates to a method and means for providing reinforcement in the third dimension. In this instance, layers of fabric are wound on a roll. As each layer is wound, it is pierced by a plurality of needles. When the specified number of layers are deposited, the needles are withdrawn and replaced by reinforcement.

12 Claims, 4 Drawing Figures

METHOD OF AND APPARATUS FOR MAKING HOLLOW 3-D MATERIAL

The most widely used composite material is a two-dimensional reinforced material in which a shape is made by providing overlying layers of fabric, a laminate. The fabric is impregnated with a resin, molded and cured. The strength of the composite is in the fabric; the strength is in two dimensions, namely within the plane of the fabric.

Of late, a new form of composite has been gaining popularity. In addition to the layers of fabric, reinforcement is provided in a direction perpendicular or at another angle to the plane of the fabric by weaving or threading reinforcement material between layers of fabric. In the vernacular, this type of composite is a 3-D composite. In general, 3-D composites are formed by first forming a free-standing 3-D material. The 3-D material is then impregnated and cured to form the composite.

3-D materials have been formed by weaving mutually angularly disposed, generally, orthogonal threads.

3-D materials are also formed by providing a plurality of layers of fabric. As the layers are laid down, they are pierced by needles. When a predetermined number of layers are formed, the needles are removed and a reinforcement is inserted in the passages made by the needles.

This invention relates to the latter form of 3-D material. This invention is directed to a method and apparatus for forming hollow 3-D shapes, and specifically for providing reinforcement in the third dimension.

This invention is particularly useful for making high temperature-high performance brakes. In this case, the 3-D material is formed from carbonaceous fabric. The 3-D material is cured with a material which can be pyrolized to form a carbonaceous residue, thereby forming a totally heat resistant and wear resistant material.

It is an object of the invention to provide a method and apparatus for constructing 3-D material.

It is another object of the invention to provide a method and means for constructing reinforcement in the third dimension, e.g., radials.

It is another object of the invention to provide a method and apparatus for making 3-D material from continuous lengths of fabric, tape or thread.

It is yet another object of the invention to provide a method and apparatus whereby layers of fabric are formed on a roll. Each layer is pierced to form passages through the accumulation of layers for receiving reinforcement.

It is yet another object of the invention to provide a method and apparatus for forming 3-D material utilizing rolls of fabric.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1a is a pictorial representation of a needle bar;

This invention will be described for the purpose of forming a cylindrical material, although other surfaces of revolution may be accommodated.

Figure 1:
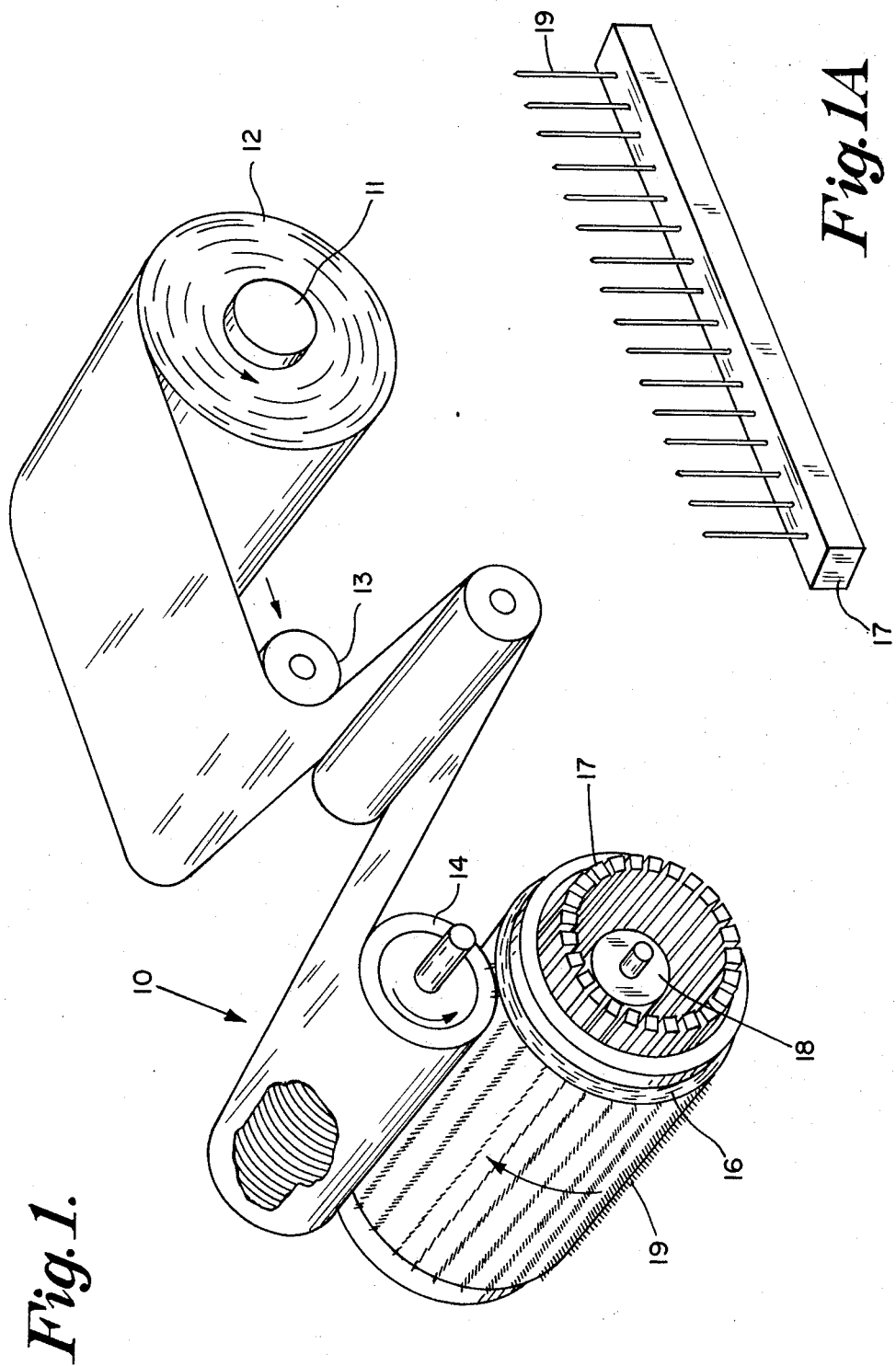
FIG. 1 is a schematic representation of an apparatus embodying the principles of the present invention.

Referring to FIG. 1 of the drawings, there is shown a schematic representation of an apparatus 10 for constructing a 3-D material in accordance with the principles of the present invention. The apparatus 10 includes a feed roll 11 containing a roll of fabric 12. A fabric tensioning device 13 is interposed between the feed roll 11 and the take-up roll 16. The take-up roll 16 includes a cam 18 and a compaction roll 14.

Figure 2:
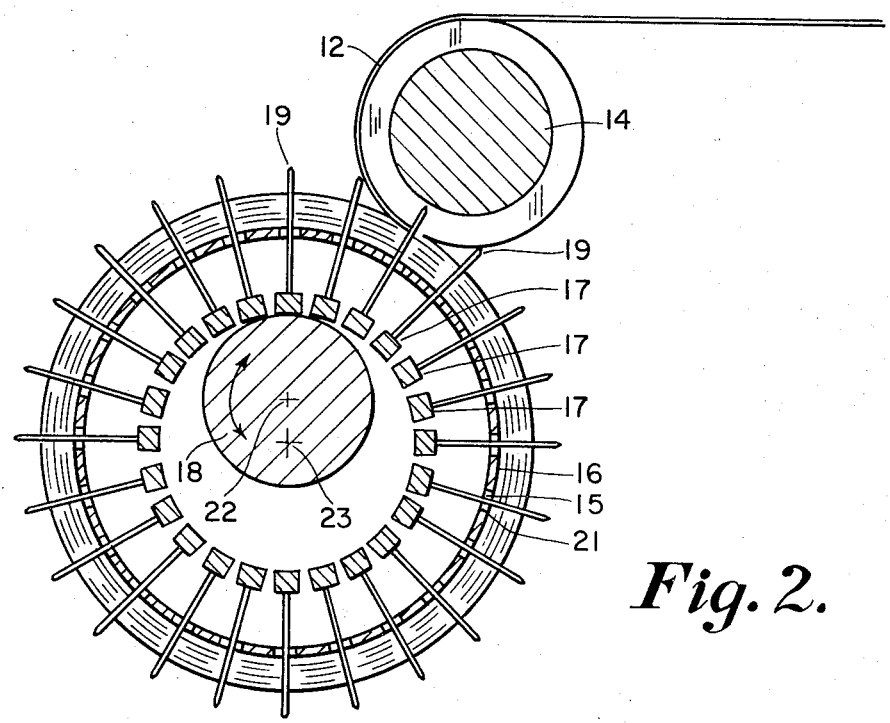
FIG. 2 is an end view of the take-up roll of the FIG. 1 apparatus.
Figure 3:
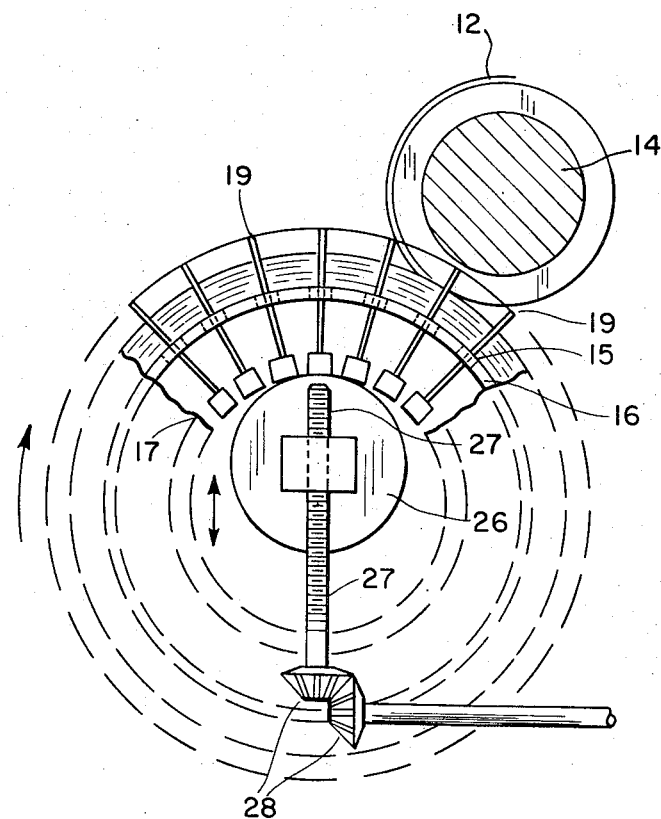
FIG. 3 is an alternate end view of a take-up roll.

The take-up roll 16 is, in this instance, a cylinder mounted for rotation about its axis. The wall of the cylinder 16 contains a uniform distribution of radial apertures 15 as is best illustrated in FIGS. 2 and 3.

Referring again to FIG. 2 of the drawings, there is shown a plurality of needle bars 17 contained within and spaced from the take-up roll 16. The needle bars 17 (see FIG. 1a) are elongated bars containing a plurality of spaced needles 19 extending transversely from a surface of the needle bars 17. The spacing of the needles 19 along the length of the needle bars 17 is complementary to the axial displacement of the apertures 15 within the take-up roll 16.

The needle bars 17 are disposed axially within the take-up roll 16 and form a concentric cylinder therein. The needle bars 17 are mounted for radial movement within the take-up roll 16. The needles 19 are disposed within the apertures 15 of the take-up roll 16, as illustrated in FIGS. 2 and 3.

Within the circle formed by the needle bars 17 is a means for moving the needle bars 17 outwardly as the take-up roll 16 is rotated. This function is performed by an offset cam 18 in FIG. 2 and by a roller 26 in FIG. 3.

As seen in FIG. 2, the center 22 of the cam 18 is radially spaced from the center 23 of the take-up roll 16. Thus, as the cam 18 is rotated, it will tend to move a needle bar 17 radially outwardly as each needle bar 17 comes in contact with the surface of the cam 18.

Referring to FIG. 3, the roller 26 is mounted on a lead screw 27. The roller 26 is free to rotate about its axis. The roller 26 is moved radially outwardly by rotating the lead screw 27. This is accomplished by means of a pair of gears 28 and an auxilliary motor or hand crank, not shown.

Referring again to FIG. 1, a section of the surface of the compaction roll 14 is illustrated. It is seen that the surface of the compaction roll 14 contains a plurality of longitudinal spaced recesses in which the exposed points of the needles 19 fit as the take-up roll 16 and the compaction roll 14 are rotated. The relative position of a needle 19 within a recess of the compaction roll 14 is illustrated in FIG. 2.

The method of making a 3-D fabric is as follows. Fabric 12 from the feed roll 11 is fed through a conventional textile tensioning device 13 over the compaction roll 14 and onto the surface of the take-up roll 16. As the fabric is placed on the surface of the take-up roll 16, it is pierced and held on the take-up roll 16 by one or more lines of needles 19. The take-up roll 16 is rotated, in this instance clockwise, and draws additional fabric from the feed roll 11 as it rotates. As the fabric is laid down on the surface of the take-up roll 16, it is continuously pierced by the needles 19 as best illustrated in FIG. 2. The compaction roll 14 applies a radial pressure against the surface of the fabric as the fabric comes in contact with the take-up roll 16. Each layer of fabric is thereby compacted against the preceding layer of fabric. In this way, a maximum number of layers per inch of depth is achieved.

The ends of the needles 19 are continually exposed beyond the fabric. This exposure is achieved by moving the needle bars 17 radially outwardly as the layers of fabric are deposited on the take-up roll 16. This radial movement of the needle bars 17 is accomplished by means of the aforementioned cam 18 and the bar 26. The movement of the cam 18 and the bar 26 and accordingly the radial movement of the needle bars 17 may be synchronized with the rotation of the take-up roll 16 so that the needle bars 17 are moved a distance equal to a fabric thickness with each revolution of the take-up roll 16.

The third dimension, radial, reinforcement is provided after a predetermined thickness of material is disposed on the take-up roll 16. In this instance, the take-up roll 16 is removed from the apparatus 10. The needle bars 17 are withdrawn in sequence. As each needle 19 is removed from the fabric, it leaves a passage through the layers of fabric which is filled by a compatible reinforcement. In the illustrated application of a carbonaceous brake material, the radial reinforcement may be a carbonaceous thread. In the alternative, it may be a pre-conditioned reinforced composite.

In the alternative, the process lends itself to the use of a fabric tape or thread instead of a fabric broad goods as illustrated. In this case, there are no lateral layers of fabric. The two-dimensional "layer system" is formed by crisscrossing a tape or thread over the surface of the take-up roll 16 until a desired buildup of materials is produced. The needles 19 which form the passages for the radial reinforcement pierce the tape or thread. The net result is a 3-D material similar to the material formed from fabric broad goods. Of necessity, a lower density material is produced because of the method of applying the tape or thread to the surface of the take-up roll 16. The use of tape or thread is better suited for complex shapes.

Radially aligned needles were depicted and described. It is clear that the needles need not be necessarily grouped in this way. They may be made to move along a chord of a circle, for example.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. Means for producing a hollow 3-D material comprising:
   a. means for supplying a continuous length of fabric to a take-up roll;
   b. a hollow take-up roll mounted for rotation about its axis and on which said fabric may be wound, said take-up roll having apertures defined through the wall thereof;
   c. needle means disposed within said apertures and exposed above the surface of the take-up roll, said needle means being further adapted to move through said apertures for piercing said fabric as it is wound on the take-up roll;
   d. means for moving said needles outwardly as said fabric is being wound on said take-up roll for maintaining said needles exposed above said fabric; and
   e. means for removing said needles from said fabric.

2. A means for producing hollow 3-D material as defined in claim 1 where said take-up roll is a cylinder.

3. Means for producing a hollow 3-D material as defined in claim 1 wherein said needles move radially through said apertures.

4. A means for producing a hollow 3-D material as defined in claim 1 where said means for moving said needles is an offset rotating cam.

5. Means for producing a hollow 3-D material as defined in claim 1 wherein said means for moving said needles is a roll moveable radially outwardly.

6. Means for producing a hollow 3-D material as defined in claim 1 wherein said needles are mounted on axially aligned needle bars contained within the take-up roll, said needle bars are uniformly spaced to form an internal concentric cylinder.

7. An apparatus for producing 3-D cylinders comprising:
   a. means for supplying a continuous length of fabric under tension;
   b. a take-up roll having spaced radially disposed holes;
   c. axially disposed needle bars contained within the roll and arranged to form an internal concentric cylinder;
   d. an eccentric cam positioned within the cylinder formed by said bars, said cam contacting said bars for changing the diameter of said cylinder of bars as said cam is rotated;
   e. means for rotating said cam in synchronism with the rotation of said roll; and
   f. radially disposed needles extending from said bars through the radial holes in the roll and extending above the surface of said roll.

8. A method of making a hollow 3-D material comprising the steps of:
   a. winding fabric on the surface of a take-up roll and onto a plurality of needles exposed above the surface of the roll, said needles being moved outwardly as the fabric builds up on the roll to maintain said exposure; and
   b. removing said needles and filling the passages formed thereby in the buildup of fabric with reinforcement.

9. A method of making a hollow 3-D material as defined in claim 8 wherein the fabric is taken from the class consisting essentially of broad goods, tape or thread.

10. A method of making a hollow 3-D material as defined in claim 8 where said take-up roll is a cylinder and said needles move radially.

11. A means as described in claim 1 which includes in addition means for compacting said fabric as it is wound on said take-up roll.

12. An apparatus as defined in claim 11 wherein said compacting means is a roll in contact with the surface of the take-up roll for applying pressure on said take-up roll, the compacting means includes grooves spaced to complement the spacing of said needles so as to contain the exposed ends of said needles as the take-up roll and compacting roll rotate together.

* * * * *